Feb. 1, 1944. P. SAVKO, JR 2,340,616
FLOAT GAUGE
Filed May 26, 1943

Inventor
Paul Savko, Jr.

By Clarence A. O'Brien
and Harvey B. Jacobson
Attorneys

Patented Feb. 1, 1944

2,340,616

UNITED STATES PATENT OFFICE 2,340,616

FLOAT GAUGE

Paul Savko, Jr., Whiting, Ind., assignor of one-half to Andrew M. Kozacik, Whiting, Ind.

Application May 26, 1943, Serial No. 488,615

3 Claims. (Cl. 73—315)

The present invention relates to new and useful improvements in depth measuring devices and more particularly to means for measuring the depth of liquid in tanks and similar containers.

An important object of the invention is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like reference numerals refer to like parts throughout, and in which:

Figure 1:
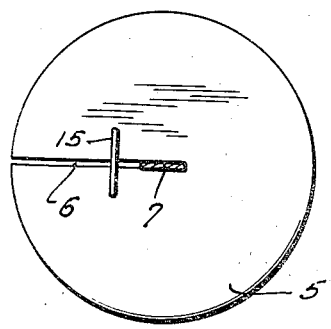
Figure 1 is a top plan view of the float with the gauge tape shown in section.
Figure 2:
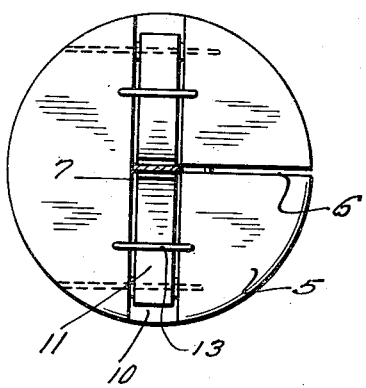
Figure 2 is a bottom plan view.
Figure 3:
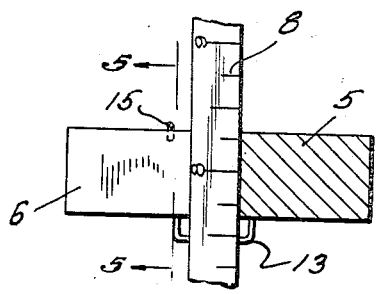
Figure 3 is a vertical sectional view through the float.
Figure 4:
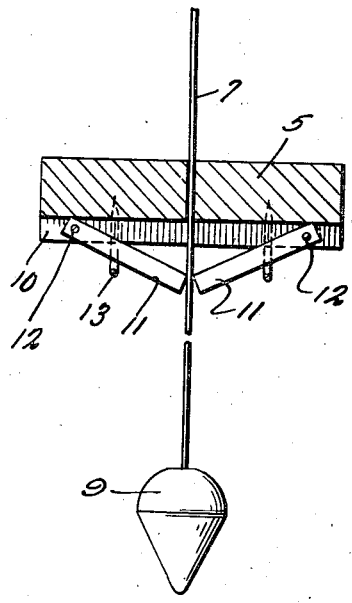
Figure 4 is a similar view showing the jaws on the underside of the float for gripping the tape.

Referring now to the drawing in detail, the numeral 5 designates a disk of wood or other buoyant material having a radial slit 6 extending from a point approximate the center of the disk to the edge thereof and adapted to receive a metal tape 7 having calibration 8 thereon in feet and fractions thereof. To the lower end of the tape is attached a weight or bob 9.

A groove or channel 10 is formed in the underside of the disk or float 5 in which a pair of buoyant jaws 11 are pivoted at their outer ends as at 12, the inner ends of the jaws being engaged with the tape at opposite sides of the latter.

Figure 5:
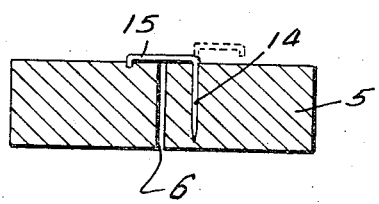
Figure 5 is a sectional view taken on a line 5—5 of Figure 1.

A pair of staples 13 are embedded in the underside of the disk and transversely of the respective jaws to function as stops to limit the downward swinging movement of the jaws and a retaining pin 14 is embedded in the top of the disk with an angular upper end 15 which extends transversely of the slot 6 to retain the tape in position therein. The pin 14 may be swung into the position shown by dotted lines in Figure 5 to release the tape, when desired.

In the operation of the device, the weighted tape is lowered in a tank or other receptacle and as the jaws touch the surface of the liquid the tape is gripped and holds the tape in a fixed position when the tape is withdrawn to indicate the depth of the liquid.

It is believed the details of construction, operation and manner of use of the device will be readily understood from the foregoing without further detailed explanation.

Having described the invention, what is claimed as new is:

1. A depth measuring device comprising a float having a radial slot adapted to slidably receive a weighted measuring tape for suspension from a position from the float, means carried by the float and bridging the slot to retain the tape therein, and a pair of buoyant jaws pivotally carried at the underside of the float and arranged for gripping opposite sides of the tape upon contact of the float with a liquid.

2. A depth measuring device comprising a float having a slot adapted to slidably receive a weighted measuring tape, a pair of buoyant jaws pivotally carried by the underside of the float and arranged in cooperating gripping engagement with opposite sides of the tape, said jaws being responsive to contact with the liquid to close the jaws, and stops carried by the float limiting opening movement of the jaws.

3. A depth measuring device comprising a float having a slot adapted to slidably receive a weighted measuring tape, said slot extending radially from the center of the float to an edge thereof, a bar pivoted on the float transversely of the slot to retain the tape therein, a pair of buoyant jaws pivotally carried by the underside of the float and arranged in cooperating gripping engagement with opposite sides of the tape, said jaws being responsive to contact with the liquid to close the jaws, and stops carried by the float limiting opening movement of the jaws.

PAUL SAVKO, JR.